(12) United States Patent
Hoshizuki et al.

(10) Patent No.: US 11,373,098 B2
(45) Date of Patent: Jun. 28, 2022

(54) PROCESSING APPARATUS, LEARNING APPARATUS, PROCESSING METHOD, AND NONVOLATILE RECORDING MEDIUM

(71) Applicant: AXELL CORPORATION, Tokyo (JP)

(72) Inventors: Yusuke Hoshizuki, Tokyo (JP); Masashi Michigami, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 919 days.

(21) Appl. No.: 16/168,073

(22) Filed: Oct. 23, 2018

(65) Prior Publication Data

US 2019/0164056 A1 May 30, 2019

(30) Foreign Application Priority Data

Nov. 24, 2017 (JP) .............................. JP2017-225462

(51) Int. Cl.
*G06N 3/08* (2006.01)
*H04L 9/00* (2022.01)
*G06N 5/04* (2006.01)
*G06N 3/04* (2006.01)

(52) U.S. Cl.
CPC ........... *G06N 3/084* (2013.01); *G06N 3/0481* (2013.01); *G06N 5/04* (2013.01); *H04L 9/008* (2013.01)

(58) Field of Classification Search
CPC ........ G06N 3/084; G06N 3/0481; G06N 5/04; H04L 9/008
See application file for complete search history.

(56) References Cited

U.S. PATENT DOCUMENTS

2016/0350648 A1  12/2016  Gilad-Bachrach et al.

FOREIGN PATENT DOCUMENTS

JP  2017-139646 A  8/2017

OTHER PUBLICATIONS

Dowlin et al ("CryptoNets: Applying Neural Networks to Encrypted Data with High Throughput and Accuracy" 2016) (Year: 2016).*
Al-nima et al (Data encryption Using Backpropagation Neural Network 2009) (Year: 2009).*

(Continued)

*Primary Examiner* — Lut Wong
(74) *Attorney, Agent, or Firm* — Oliff PLC

(57) ABSTRACT

An inference apparatus that executes a predetermined inference process using a neural network model including: an input unit configured to receive encryption data; and a processor configured to execute a process including: executing predetermined process with respect to the encryption data using the neural network model, wherein the neural network model has a processing layer that executes a process of generating second encryption data from a plurality of pieces of first encryption data input from a previous stage and outputting the second encryption data, the second encryption data providing, by being decrypted, a processing result obtained by performing operations with modulo operation with respect to plurality of pieces of plain text data corresponding to the plurality of pieces of first encryption data, the neural network model being configured such that a nonlinear function is not applied to the second encryption data in a posterior stage of the processing layer.

8 Claims, 12 Drawing Sheets

(56) References Cited

OTHER PUBLICATIONS

Telem et al ("A Simple and Robust Gray Image Encryption Scheme Using Chaotic Logistic Map and Artificial Neural Network" 2014). (Year: 2014).*
Lu et al ("Crypt—CNN(II): Crytographically Evaluate Non-linear Convolutional Neural Network" Oct. 2017) (Year: 2017).*
Xie et al ("Crypto-Nets: Neural Networks Over Encrypted Data" 2014) (Year: 2014).*
Orlandi et al. "Oblivious Neural Network Computing via Homomorphic Encryption." EURASIP Journal on Information Security, vol. 2007, pp. 1-13, 2007.
Apr. 8, 2020 Office Action issued in Japanese Patent Application No. 2017-225462.
Hesamifard, Ehsan et al. "CryptoDL: Deep Neural Networks over Encrypted Data" <URL:https://arxiv.org/abs/1711.05189v1>, [retrieved Mar. 9, 2020], 2017.
Urita, Kenji et al. "Periodic Alternate Neuron Model and Its Application to Neural Networks," Technical Research Reports, vol. 93, No. 512, 1994, pp. 53-58.
Oct. 2, 2020 Office Action issued in Japanese Patent Application No. 2017-225462.

* cited by examiner

FIG. 8

|  |  | Example1 | Example2 | Reference1 | Reference2 |
|---|---|---|---|---|---|
| Used activation function | During learning (forward propagation) | Modulo operation function | Modulo operation function | Approximate polynomial | ReLU |
|  | During learning (backward propagation) | Hyperbolic function (tanh) | Trigonometric function (sin) | Approximate polynomial | ReLU |
|  | During inference | Modulo operation function | Modulo operation function | Approximate polynomial | ReLU |
| Correct answer rate | Average | 94.5% | 94.4% | 90.3% | 95.5% |
|  | Minimum | 90.0% | 89.5% | 84.5% | 92.0% |
|  | Maximum | 98.0% | 98.0% | 94.0% | 98.5% |

PROCESSING APPARATUS, LEARNING APPARATUS, PROCESSING METHOD, AND NONVOLATILE RECORDING MEDIUM

CROSS-REFERENCE TO PRIOR APPLICATION

This application relates to and claims the benefit of priority from Japanese Patent Application No. 2017-225462 filed on Nov. 24, 2017, the entire disclosure of which is incorporated herein by reference.

BACKGROUND

The embodiments discussed herein are related to a technique of processing information using a neural network (NN).

Conventionally, a recognition process (an inference process) for recognizing images, characters, voice, and the like is performed using a neural network model which is one of machine learning architectures.

The learnt coefficient data in a neural network model has a large size, and is therefore a large load for a client apparatus only to process and it is difficult to execute the processing. In contrast, there is a demand for using cloud resources capable of performing large-scale operations in an inference process and the like of a neural network model by using a client-server model.

When a client-server model is used, since data is transmitted from a client to a server, there is a risk that high-security information such as personal information may leak.

In order to cope with the above-described problems, encrypted data (encryption data) may be transmitted to a server and the encryption data may be processed by the server using homomorphic encryption in which operations can be performed with respect to the encryption data as it is.

However, since general activation functions such as a sigmoid function or a ReLU function (a rectified linear unit rectifier) used in a neural network model are beyond the range of operations which can be executed by the existing homomorphic encryption, it is impossible to execute operations on encryption data according to the homomorphic encryption.

For example, the specification of U.S. Patent Application Publication No. 2016/0350648 discloses a technique related to a neural network which uses an approximate polynomial as an activation function.

Moreover, C. Orlandi, A. Piva, and M. Barni, Research Article "Oblivious Neural Network Computing via Homomorphic Encryption", retrieved from the Internet <http://clem.dii.unisi.it/~vipp/files/publications/S1687416107 373439.pdf> discloses a technique of realizing processing using homomorphic encryption by asking a client whenever an operation of activation functions in a neural network model is executed.

SUMMARY

In a neural network model, it is impossible to process encryption data as it is in a neural network model, or it is difficult to do so since the processing load is very large. For example, in the technique of "Oblivious Neural Network Computing via Homomorphic Encryption", exchange of data with a client occurs and processing of the client occurs whenever an operation of activation functions is executed. Therefore, the amount of communication increases and the processing time increases.

Fully homomorphic encryption or SomeWhat homomorphic encryption, which is homomorphic encryption capable of executing more kinds of operations, may be used. However, since a data amount of the encryption data encrypted by such encryption increases, there is a problem in that the processing load is very large.

The present invention has been made in view of the problems, and an object thereof is to provide a technique capable of using encryption data in a neural network model easily and appropriately.

In order to attain the object, a processing apparatus according to a first aspect is a processing apparatus that executes a predetermined process using a neural network model, including: an input unit that receives encryption data; and a processor configured to execute a process including: executing a predetermined process with respect to the encryption data using the neural network model, wherein the neural network model has a processing layer that executes a process of generating second encryption data from a plurality of pieces of first encryption data input from a previous stage and outputting the second encryption data, the second encryption data providing, by being decrypted, a processing result obtained by performing operations with modulo operation with respect to plurality of pieces of plain text data corresponding to the plurality of pieces of first encryption data, the neural network model being configured such that a nonlinear function is not applied to the second encryption data in a posterior stage of the processing layer.

In the processing apparatus, the predetermined process may be a predetermined inference process, and pre-learned setting values may be set to the neural network model.

In the processing apparatus, the setting values may be values input from a learning apparatus including: a processor configured to execute a process including: learning setting values of a learning target neural network model on the basis of learning data using the learning target neural network model and a learning result storage unit that stores the setting values of the learning target neural network model learned by the processor, wherein the processor is configured to execute a process including: when forward propagation is executed, using, as the learning target neural network model, a neural network model which has a first processing layer that executes operations with modulo operation with respect to plain text data input from a previous stage and which is configured such that a nonlinear function is not applied to an operation result of the first processing layer in a posterior stage of the first processing layer; and when backward propagation is executed to update setting values of the learning target neural network model, using, as the learning target neural network model, a neural network model including, instead of the first processing layer, a second processing layer that performs operations excluding a modulo operation from the operations with modulo operation in the first processing layer and an activation function layer that is disposed at a posterior stage of the second processing layer to perform a process based on a differentiable activation function, and using, as input, output data output when the forward propagation is executed.

In order to attain the object, a learning apparatus according to a second aspect is a learning apparatus that learns setting values of a neural network model on the basis of predetermined learning data, including: a processor configured to execute a process including: learning setting values of a learning target neural network model on the basis of the learning data using the learning target neural network model; and a learning result storage unit that stores the setting values of the learning target neural network model learned by the processor, wherein the processor is configured to execute a process including: when forward propagation is executed, using, as the learning target neural network model, a neural network model which includes a first processing layer that executes operations with modulo operation with respect to plain text data input from a previous stage and which is configured such that a nonlinear function is not applied to an operation result of the first processing layer in a posterior stage of the first processing layer; and when backward propagation is executed to update setting values of the learning target neural network model, using, as a learning target neural network model, a neural network model including, instead of the first processing layer, a second processing layer that performs operations excluding a modulo operation from the operations with modulo operation in the first processing layer and an activation function layer that is disposed at a posterior stage of the second processing layer to perform a process based on a differentiable activation function, and using, as input, output data output when the forward propagation is executed.

In the learning apparatus, when backward propagation is executed, the processor may use, as the activation function of the activation function layer, a differentiable approximate function approximated to any one of a waveform which increases continuously and decreases discontinuously at some values only, and a waveform which decreases continuously and increases discontinuously at some values only.

In the learning apparatus, the approximate function may be a hyperbolic function.

In order to attain the object, a processing method according to a third aspect may be a processing method executed by a processor to control a processing apparatus, the processing method including: the process executed by the processor including: executing a predetermined process with respect to encryption data using a neural network model, wherein the neural network model has a processing layer that executes a process of generating second encryption data from a plurality of pieces of first encryption data input from a previous stage and outputting the second encryption data, the second encryption data providing, by being decrypted, a processing result obtained by performing operations with modulo operation with respect to plurality of pieces of plain text data corresponding to the plurality of pieces of first encryption data, the neural network model being configured such that a nonlinear function is not applied to the second encryption data in a posterior stage of the processing layer.

In order to attain the object, a nonvolatile recording medium according to a fourth aspect may be a computer-readable nonvolatile recording medium having stored therein a processing program for causing a processor execute a process, the process including: receiving encryption data; and executing a predetermined process with respect to the encryption data using a neural network model, wherein the neural network model has a processing layer that executes a process of generating second encryption data from a plurality of pieces of first encryption data input from a previous stage and outputting the second encryption data, the second encryption data providing, by being decrypted, a processing result obtained by performing operations with modulo operation with respect to plurality of pieces of plain text data corresponding to the plurality of pieces of first encryption data, the neural network model being configured such that a nonlinear function is not applied to the second encryption data in a posterior stage of the processing layer.

According to the present invention, encryption data can be used easily and appropriately in a neural network model.

BRIEF DESCRIPTION OF THE DRAWINGS

FIG. 8 is a diagram for describing a recognition result of image recognition in the processing system according to the first embodiment;

DETAILED DESCRIPTION OF THE EMBODIMENT

Hereinafter, embodiments will be described with reference to the drawings. The embodiments described below are not intended to limit the inventions according to the claims, and all elements and combinations thereof described in the embodiments are not necessarily essential to the solving means for the invention.

First, a processing system according to a first embodiment will be described.

Figure 1:
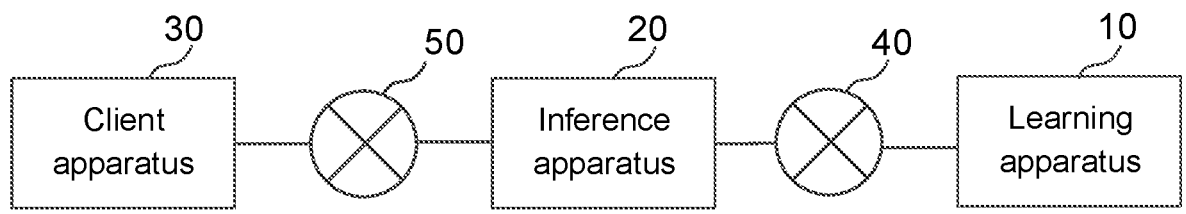
FIG. 1 is a diagram illustrating an entire configuration of a processing system according to a first embodiment.

FIG. 1 is a diagram illustrating an entire configuration of a processing system according to the first embodiment.

The processing system 1 includes a learning apparatus 10 as an example of a processing apparatus, an inference apparatus 20 as an example of the processing apparatus, and a client apparatus 30. The learning apparatus 10 and the inference apparatus 20 are coupled to each other via a network 40. Moreover, the inference apparatus 20 and the client apparatus 30 are coupled to each other via a network 50. The networks 40 and 50 are Local Area Networks (LANs), Wide Area Networks (WANs), or the like, for example. Although the networks 40 and 50 are separate networks in FIG. 1, these networks may be the same network.

The learning apparatus 10 performs learning of a neural network model. The inference apparatus 20 sets a neural network model on the basis of a learning result (setting values such as coefficients (weighting factors or biases) of the neural network model) of the neural network model obtained by the learning apparatus 10, and performs an inference process. The client apparatus 30 is an apparatus used by a user, for example, and transmits data (target data) serving as a target of an inference process to the inference apparatus 20 and receives the result (an inference result) of the inference process from the inference apparatus 20.

Figure 2:
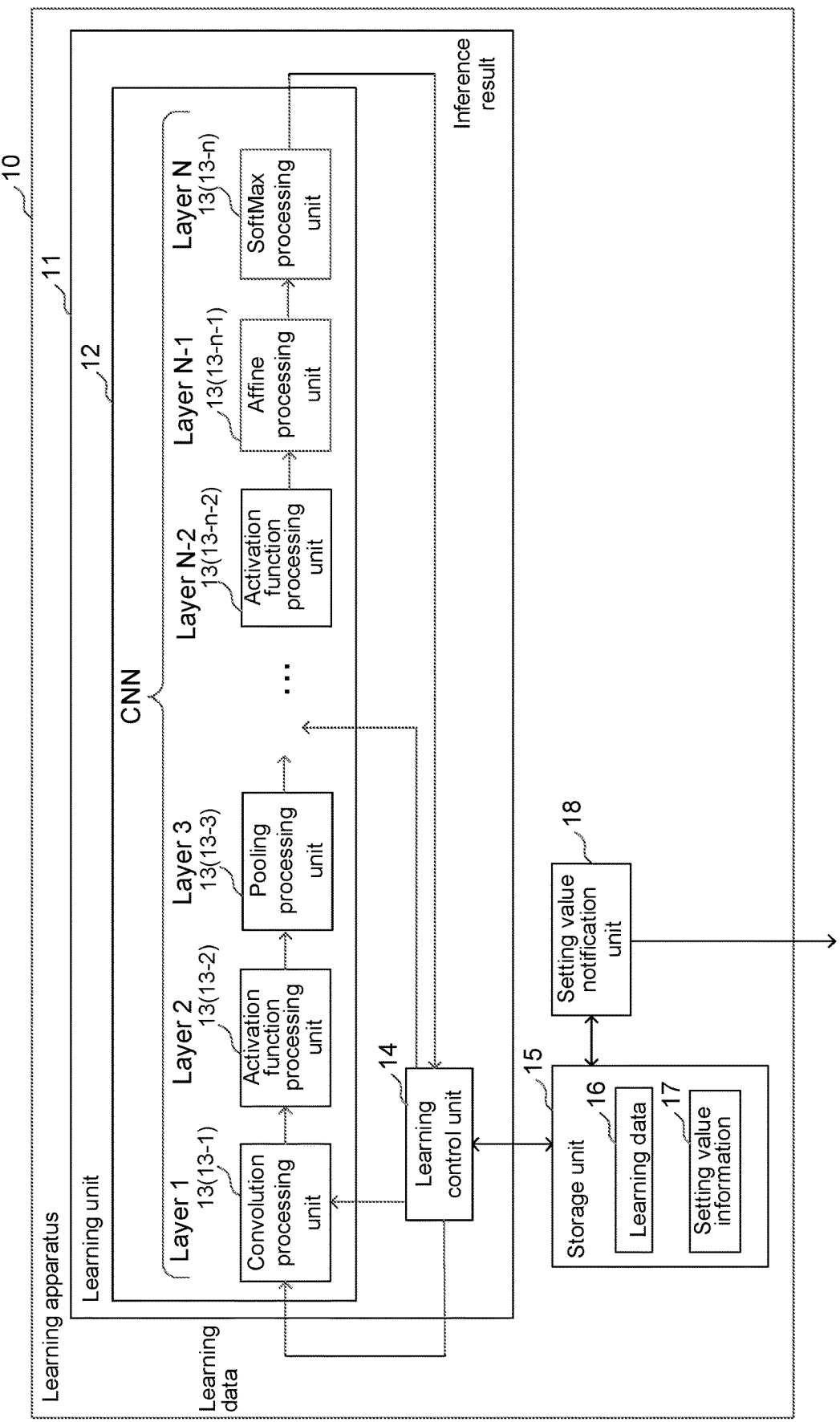
FIG. 2 is a diagram illustrating a functional configuration of a learning apparatus according to the first embodiment.

FIG. 2 is a diagram illustrating a functional configuration of the learning apparatus according to the first embodiment.

The learning apparatus 10 includes a learning unit 11 as an example of a process execution unit, a storage unit 15 as an example of a learning result storage unit, and a setting value notification unit 18 as an example of a notification unit.

The learning unit 11 includes a neural network model 12 and a learning control unit 14 as an example of an input unit.

The neural network model 12 is a model of a convolutional neural network (CNN) for executing an inference process of inferring what image data serving as a processing target represents and outputting an inference result. The neural network model 12 includes a plurality of processing layers (layers). In the present embodiment, the neural network model 12 is used for performing learning of the setting values. In the example of FIG. 1, the neural network model 12 includes layers 1 to N. A process (a sub-process) in each layer is executed by each processing unit 13. For example, the neural network model 12 is a model for executing an inference process of inferring what image data serving as a processing target represents (for example, what such as a person, a dog, or a cat is included) and outputting an inference result. The number of layers of the neural network model 12 and the type and the content of a sub-process executed in each layer can be set arbitrarily.

The configuration of the neural network model 12 illustrated in FIG. 2 is an example only, and includes a convolution processing unit 13-1 that executes a sub-process of layer 1, an activation function processing unit 13-2 that executes a sub-process of layer 2 (an activation function layer), a pooling processing unit 13-3 that executes a sub-process of layer 3, an activation function processing unit 13-n-2 that executes a sub-process of layer N-2, an affine processing unit 13-n-1 that executes a sub-process of layer N-1, and a SoftMax processing unit 13-n that executes a sub-process of layer N.

The convolution processing unit 13-1 performs a convolution process with respect to input image data using each of a plurality of pieces of filter data (an example of a setting value). The activation function processing units 13-2, 13-n-2, and the like execute a process of converting data generated by the previous layers by an activation function. The activation function is a function for separating a previous layer and a subsequent layer nonlinearly, that is, a function for preventing a previous layer and a subsequent layer from being coupled as a linear function. In the present embodiment, a function of a waveform of which the output value has any one of a finite range of values according to an input value (for example, a function having a so-called sawtooth waveform (for example, a function including modulo operations (a modulo operation function) or a differentiable approximate function approximated to such a waveform is used as an activation function of at least one of the activation function processing units 13-2, 13-n-2, and the like. A sawtooth waveform may be a waveform which increases continuously (increases monotonously) and decreases discontinuously at some values only or a waveform which decreases continuously (decreases monotonously) and increases discontinuously at some values only. Here, monotonous increase (monotonous decrease) may include increase (decrease) with a fixed inclination and increase (decrease) with a varying inclination. The differentiable approximate function approximated to a waveform may be a hyperbolic function (tank or the like), a high-order (for example, a 20th-order or the like) trigonometric function, or a polynomial. When a hyperbolic function is used as the activation function, the processing amount is smaller and a necessary processing time is shorter than those when a high-order trigonometric function or a polynomial is used.

In the present embodiment, a method of backward propagation of errors, for example, is used as a method of learning the setting values of the neural network model 12, the modulo operation function is used as the activation function when forward propagation is executed in the neural network model 12, and a differentiable approximate function which can be computed in the method of backward propagation of errors is used as the activation function when backward propagation is executed to update the setting value. When the method of backward propagation of errors is not used, the modulo operation function may be used in both cases of executing forward propagation and backward propagation.

Figure 3:
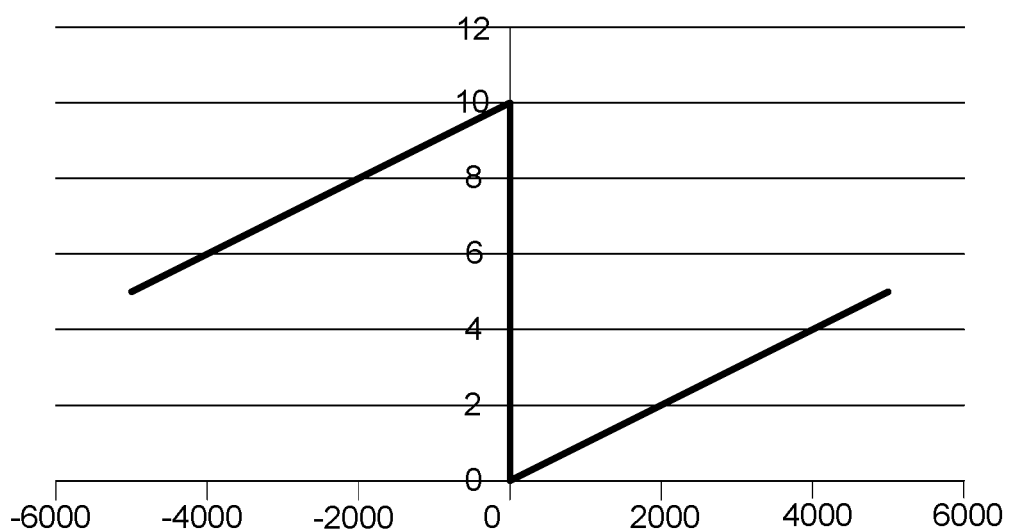
FIG. 3 is a diagram for describing an example of a modulo operation function used as an activation function according to the first embodiment.

FIG. 3 is a diagram for describing an example of a modulo operation function used as an activation function according to the first embodiment. In FIG. 3, the horizontal axis represents an input value input from a previous processing layer and the vertical axis represents an output value output by the modulo operation function.

This modulo operation function is a modulo operation function when a minimum value of an input value is larger than −5000 and a maximum value of the input value is smaller than 5000. This modulo operation function can be represented as (input value/1000) mod 10. A mod B represents a remainder when A is divided by B (a divisor). In the present embodiment, although the remainder includes a decimal part, the remainder may be an integer obtained by eliminating a faction part.

This modulo operation function is a function of a waveform (so-called a sawtooth waveform) of which the output value changes to approach a maximum value as an input value increases in a range (a first range) from a minimum value of the input value to 0 (an example of a first value), the output value is 0 (the minimum value of the output value) when the input value is 0, and the output value changes away from the minimum value as the input value increases in a range (a second range) from the first value to a maximum value of the input value. In this modulo operation function, the output value in the first range and the output value in the second range do not have the same output value. That is, it is possible to appropriately prevent input values having largely different values from being converted to the same output value. In the present embodiment, the activation function processing unit uses a function having a range equal to or smaller than a width corresponding to one tooth of the sawtooth of the function of a sawtooth waveform.

The modulo operation function illustrated in FIG. 3 is a function that divides an input value having a range larger than −5000 and smaller than 5000 bp 1000 and computes a remainder of a value obtained after the division. According to this modulo operation function, the width of a range of values obtained after division of an input value can be made smaller than a divisor (that is, 10) used for modulo operation. The process of dividing the input value is a process for causing the width of a range of input values to fall within a width corresponding to one period (a range from a minimum value to a maximum value with increase in an input value) of modulo operation. In this manner, since the width of a range of values obtained after division of an input value can be made smaller than a divisor used for modulo operation, it is possible to appropriately prevent input values having largely different values from being converted to the same output value.

A value that divides an input value and a divisor of the modulo operation are not limited to the above-described values. For example, the value that divides an input value may be determined on the basis of a range of input values (that is, output values of a processing unit of a previous layer) input to each activation function processing unit. Moreover, the input value may not be divided. In this case, a large divisor may be used for modulo operation according to an input value.

Returning to FIG. 2, the pooling processing unit 13-3 executes a process of down-sampling input data. The affine processing unit 13-$n$-1 executes an affine transformation process with respect to input data. The SoftMax processing unit 13-$n$ executes a process based on the SoftMax function with respect to input data.

The learning control unit 14 inputs learning data 16 stored in the storage unit 15 to the neural network model 12 and learns setting values of the neural network model 12 on the basis of an inference result output from the neural network model 12. In the present embodiment, the learning control unit 14 uses a modulo operation function as an activation function of at least one of the activation function processing units 13-2, 13-$n$-2, and the like of the neural network model 12 when forward propagation is executed during learning and uses an approximate function as an activation function of at least one of the activation function processing units 13-2, 13-$n$-2, and the like of the neural network model 12 when backward propagation is executed during learning. When learning of the learning data 16 is finished, the learning control unit 14 stores setting values obtained by learning in the storage unit 15.

The storage unit 15 stores learning data 16 used for the learning unit 11 to learn the neural network model 12 and setting value information 17 which is information on the setting value such as coefficients of the neural network model 12. The learning data 16 may be stored in the storage unit 15 as teacher data correlated with the inference result data corresponding to the learning data 16. Examples of the setting values included in the setting value information 17 include coefficients of filters used by the convolution processing unit 13-1 and the like and weighting factors used by the affine processing unit 13-$n$-1 and the like.

The setting value notification unit 18 transmits the setting value information 17 stored in the storage unit 15 to the inference apparatus 20.

Next, the inference apparatus 20 will be described in detail.

Figure 4:
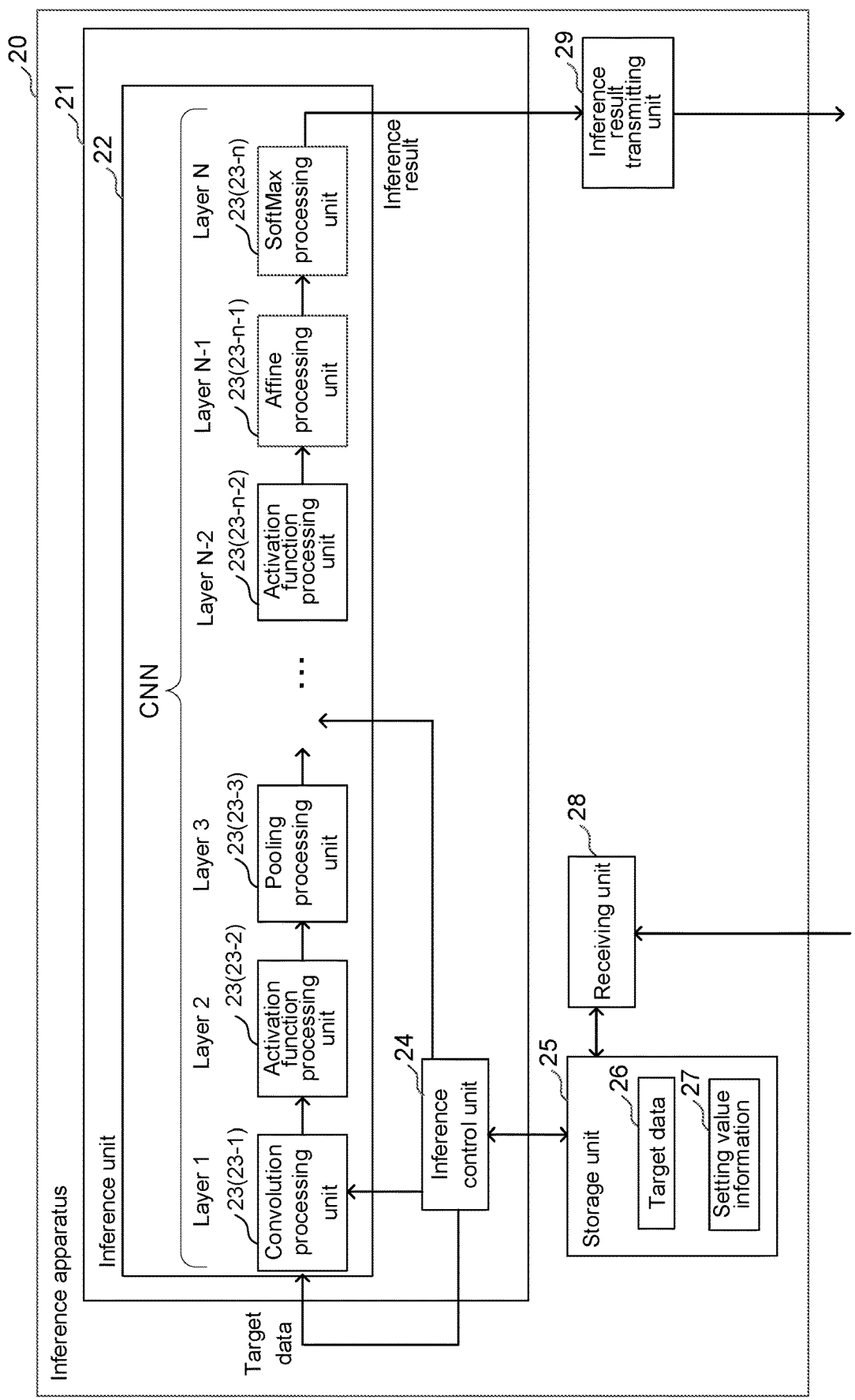
FIG. 4 is a diagram illustrating a functional configuration of an inference apparatus according to the first embodiment.

FIG. 4 is a diagram illustrating a functional configuration of an inference apparatus according to the first embodiment.

The inference apparatus 20 includes an inference unit 21 as an example of a process execution unit, a storage unit 25, a receiving unit 28 as an example of an input unit, and an inference result transmitting unit 29.

The inference unit 21 includes a neural network model 22 and an inference control unit 24.

The neural network model 22 is a model of a convolutional neural network (CNN) for executing an inference process of inferring what image data serving as a processing target represents and outputting an inference result and includes a plurality of processing layers (layers). In the present embodiment, the neural network model 22 is a configuration (in the present embodiment, the same configuration as) corresponding to the neural network model 12 of the learning apparatus 10. That is, in the example of FIG. 4, the neural network model 22 includes layers 1 to N. A process (a sub-process) in each layer is executed by each processing unit 23. For example, the neural network model 22 is a model for executing an inference process of inferring what image data serving as a processing target represents (for example, what such as a person, a dog, or a cat is included) and outputting an inference result. The number of layers of the neural network model 22 and the type and the content of a sub-process executed in each layer can be set arbitrarily.

The configuration of the neural network model 22 illustrated in FIG. 4 is an example only. In the example illustrated in FIG. 4, the neural network model 22 includes a convolution processing unit 23-1 that executes a sub-process of layer 1, an activation function processing unit 23-2 that executes a sub-process of layer 2 (an activation function layer), a pooling processing unit 23-3 that executes a sub-process of layer 3, an activation function processing unit 23-$n$-2 that executes a sub-process of layer N-2, an affine processing unit 23-$n$-1 that executes a sub-process of layer N-1, and a SoftMax processing unit 23-$n$ that executes a sub-process of layer N. The convolution processing unit 23-1, the activation function processing unit 23-2, the pooling processing unit 23-3, the activation function processing unit 23-$n$-2, the affine processing unit 23-$n$-1, and the SoftMax processing unit 23-$n$ correspond respectively to the convolution processing unit 13-1, the activation function processing unit 13-2, the pooling processing unit 13-3, the activation function processing unit 13-$n$-2, the affine processing unit 13-$n$-1, and the SoftMax processing unit 13-$n$ in FIG. 2, and execute the same processes as those of the corresponding units.

The activation function processing units 23-2, 23-$n$-2, and the like execute a process of converting data generated by the previous layers by an activation function. In the present embodiment, a function of a waveform of which the output value has any one of a finite range of values according to an input value, for example, a modulo operation function including modulo operations is used as an activation function of at least one of the activation function processing units 23-2, 23-$n$-2, and the like. In the present embodiment, the same activation function as the activation function of the activation function processing unit corresponding to the learning apparatus 10 is used as the activation function of the activation function processing units 23-2, 23-$n$-2, and the like.

The inference control unit 24 performs setting of the neural network model 22 on the basis of the setting value information 27 stored in the storage unit 25. That is, the inference control unit 24 sets the coefficients and the like of the processing layer. Moreover, the inference control unit 24 inputs the target data 26 which is processing target data to the neural network model 22 so that an inference process is executed by the neural network model 22.

The storage unit 25 stores the target data 26 which is a target of an inference process to be executed by the neural network model 22 of the inference unit 21 and the setting value information 27 which is information on the setting values such as the coefficients and the like of the neural network model 22. Examples of the setting values included in the setting value information 27 include coefficients of filters used by the convolution processing unit 23-1 and the like and weighting factors used by the affine processing unit 23-$n$-1 and the like.

The receiving unit 28 receives the setting value information transmitted from the learning apparatus 10 and stores the setting value information in the storage unit 25. Moreover, the receiving unit 28 receives the target data 26 transmitted from the client apparatus 30 and stores the target data 26 in the storage unit 25.

The inference result transmitting unit 29 transmits the result (an inference result) of the inference process executed by the neural network model 22 of the inference unit 21 to the client apparatus 30.

An input/output I/F 207 is coupled to an input device 209 such as a mouse and a keyboard, for example, and receives operations input by an administrator of the inference apparatus 20 from the input device 209.

A display device 208 is a display apparatus such as a liquid crystal display, for example, and displays and outputs various pieces of information.

Figure 5:
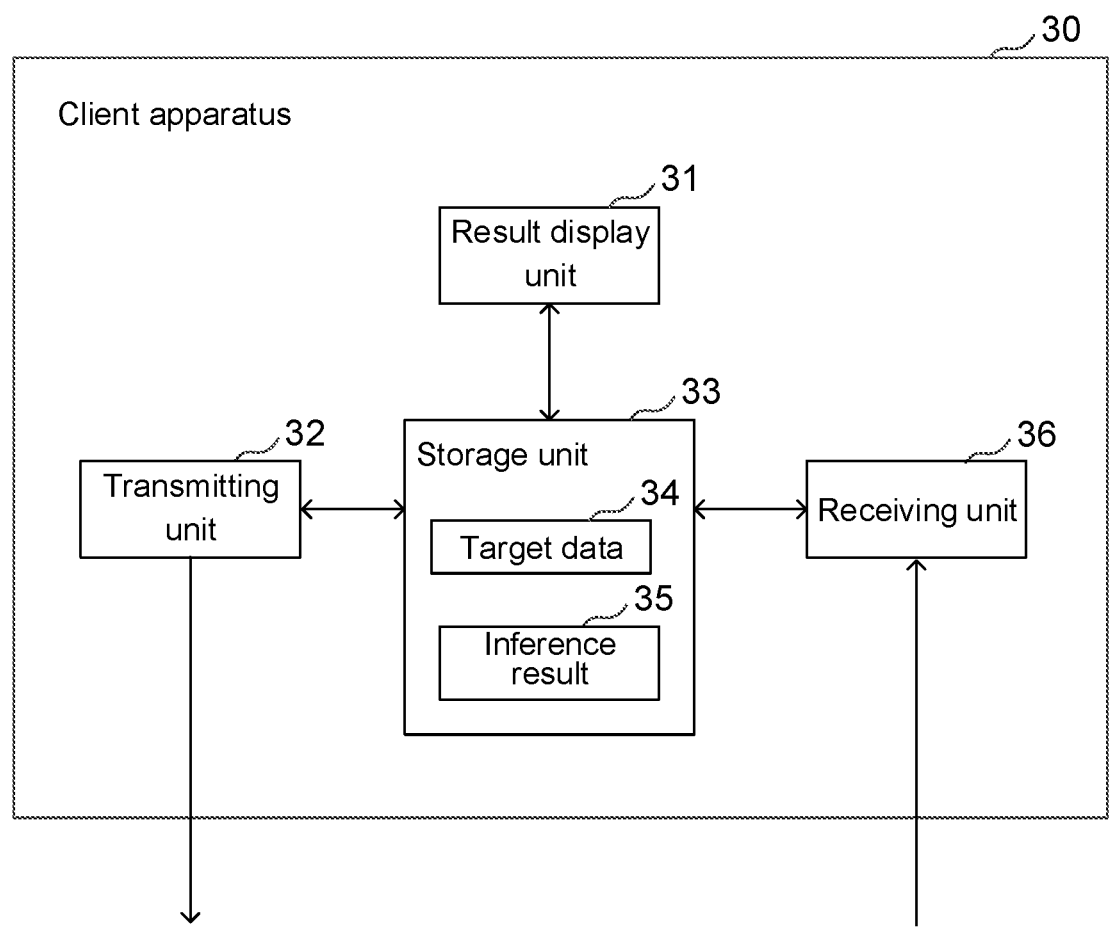
FIG. 5 is a diagram illustrating a functional configuration of a client apparatus according to the first embodiment.

Next, the client apparatus 30 will be described in detail. FIG. 5 is a diagram illustrating a functional configuration of a client apparatus according to the first embodiment.

The client apparatus 30 includes a result display unit 31, a transmitting unit 32, a storage unit 33, and a receiving unit 36.

The storage unit 33 stores target data 34 that is subject to an inference process and an inference result 35 of the inference process. The inference result 35 is stored when an inference result is transmitted from the inference apparatus 20, and an inference result on the target data 34 that is not subject to an inference process of the inference apparatus 20 is not present.

The transmitting unit 32 transmits target data of an inference process to the inference apparatus 20. The receiving unit 36 receives an inference result of an inference process from the inference apparatus 20 and stores the inference result in the storage unit 33. The result display unit 31 displays and outputs various pieces of information on the basis of the inference result 35 stored in the storage unit 33. The result display unit 31 may display the inference result 35 as it is and may execute a predetermined process on the basis of the inference result 35 and display an execution result thereof.

Figure 6:
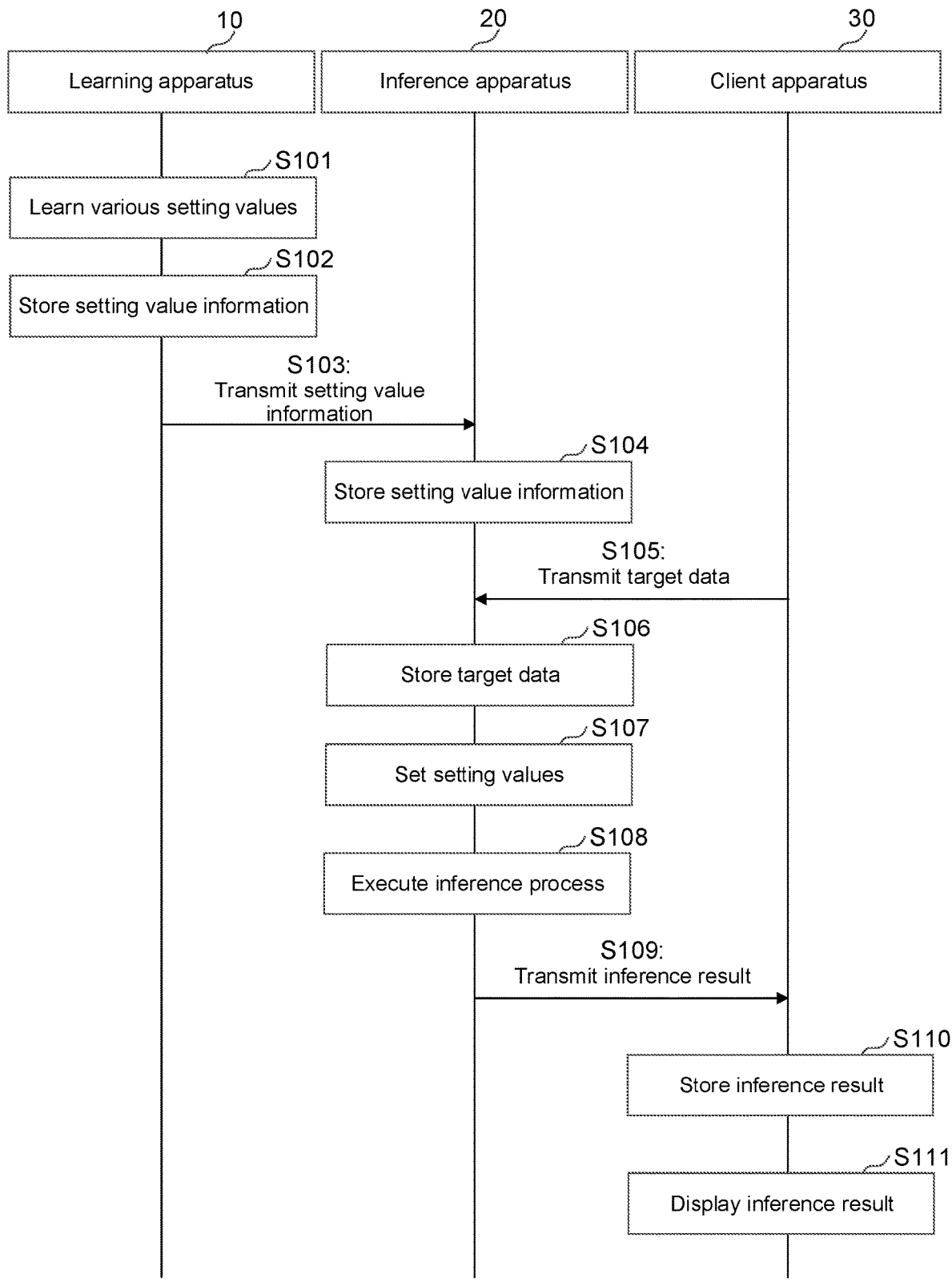
FIG. 6 is a sequence diagram illustrating an operation of the processing system according to the first embodiment.

FIG. 6 is a sequence diagram illustrating an operation of the processing system according to the first embodiment. Referring to FIG. 6, a processing operation of the processing system 1 according to the present embodiment will be described.

The learning control unit 14 of the learning apparatus 10 causes the neural network model 12 of the learning unit 11 to execute an inference process using the learning data 16 stored in the storage unit 15 whereby various setting values of the processing unit 13 of the neural network model 12 are learned (S101). Subsequently, the learning control unit 14 stores setting value information on the setting values obtained by learning in the storage unit 15 (S102).

Subsequently, the setting value notification unit 18 reads the setting value information 17 stored in the storage unit 15 and transmits the setting value information 17 to the inference apparatus 20 (S103).

The receiving unit 28 of the inference apparatus 20 receives the setting value information 17 transmitted from the learning apparatus 10 and stores the setting value information 17 in the storage unit 25 (S104). Moreover, the transmitting unit 32 of the client apparatus 30 transmits the target data to the inference apparatus 20 (S105). The receiving unit 28 of the inference apparatus 20 receives inference target data from the client apparatus 30 and stores the target data in the storage unit 25 (S106). Either one of a time point at which the setting value information 17 is received or a time point at which the target data is received may be earlier than the other. That is, it is sufficient if both pieces of information are obtained until an inference process is executed.

The inference control unit 24 of the inference apparatus 20 acquires the setting value information 27 from the storage unit 25 and sets setting values with respect to the corresponding processing unit 23 of the neural network model 22 (S107). Subsequently, the inference control unit 24 reads the target data 26 from the storage unit 25 and inputs the target data 26 to the processing unit 23 of the first processing layer (layer 1) of the neural network model 22. As a result, an inference process for the target data 26 is executed by the neural network model 22, and the inference result is output from the processing unit 23 of the last processing layer (layer N) to the inference result transmitting unit 29 (S108).

Subsequently, the inference result transmitting unit 29 of the inference apparatus 20 transmits the inference result received from the neural network model 22 to the client apparatus 30 that has requested for an inference process on the target data (S109).

The receiving unit 36 of the client apparatus 30 receives the inference result from the inference apparatus 20 and stores the inference result in the storage unit 33 (S110). After that, the result display unit 31 displays and outputs the inference result on the basis of the inference result 35 stored in the storage unit 33 (S111).

Figure 7:
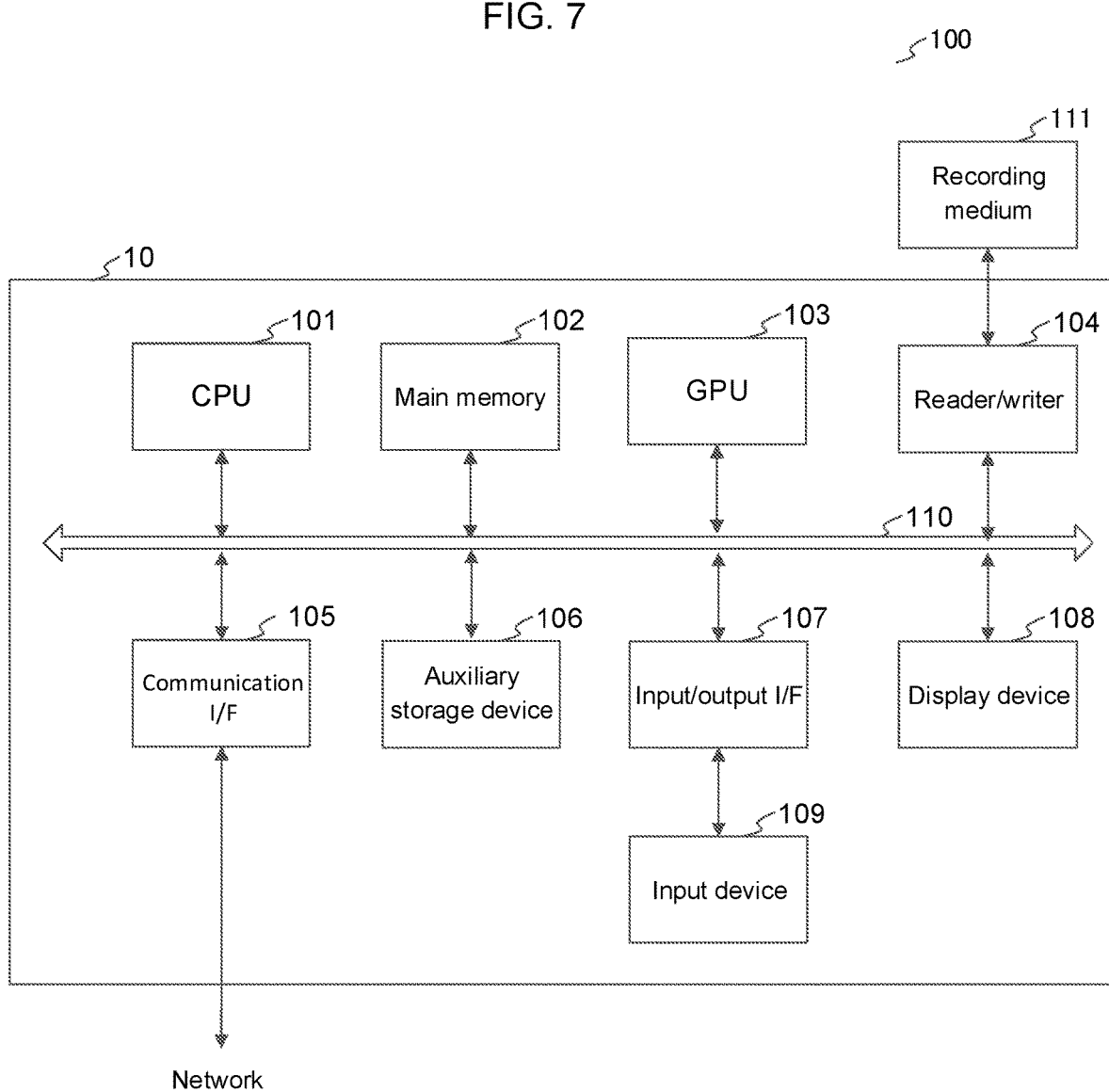
FIG. 7 is a block diagram illustrating an embodiment of a computer apparatus.

The learning apparatus 10, the inference apparatus 20, and the client apparatus 30 each can be configured by a computer apparatus. FIG. 7 is a block diagram illustrating an embodiment of a computer apparatus. In the present embodiment, the learning apparatus 10, the inference apparatus 20, and the client apparatus 30 are configured as separate computer apparatuses. However, since these computer apparatuses can have the same configuration, the computer apparatuses that form the learning apparatus 10, the inference apparatus 20, and the client apparatus 30 will be described using a computer apparatus illustrated in FIG. 7 for the sake of convenience.

A computer apparatus 100 includes a CPU (Central Processing Unit) 101, a main memory 102, a GPU (Graphics Processing Unit) 103, a reader/writer 104, a communication interface (a communication I/F) 105, an auxiliary storage device 106, an input/output interface (an input/output I/F) 107, a display device 108, and an input device 109. The CPU 101, the main memory 102, the GPU 103, the reader/writer 104, the communication I/F 105, the auxiliary storage device 106, the input/output I/F 107, and the display device 108 are coupled to one other via a bus 110. The learning apparatus 10, the inference apparatus 20, and the client apparatus 30 each are formed by appropriately selecting some or all of constituent elements of the computer apparatus 100.

Here, at least one of the main memory 102 and the auxiliary storage device 106 functions as the storage unit 15 of the learning apparatus 10, the storage unit 25 of the inference apparatus 20, and the storage unit 33 of the client apparatus 30.

The CPU 101 of the computer apparatus 100 that forms the learning apparatus 10 controls the entire learning apparatus 10 in an integrated manner. The CPU 101 executes various processes by reading a program stored in the auxiliary storage device 106 into the main memory 102 and executing the program. In the learning apparatus 10, the CPU 101 forms the neural network model 12 of the learning unit 11, for example, by executing a processing program stored in the auxiliary storage device 106. Moreover, in the computer apparatus 100 that forms the inference apparatus 20, the CPU 101 forms the neural network model 22 of the inference unit 21, for example, by executing a processing program stored in the auxiliary storage device 106. Furthermore, in the computer apparatus 100 that forms the client apparatus 30, the CPU 101 forms the result display unit 31, for example, by executing a processing program stored in the auxiliary storage device 106. The CPU 101 of the computer apparatus 100 that forms the inference apparatus 20 may have a better processing performance than the CPU 101 of the computer apparatus 100 that forms the client apparatus 30.

The main memory 102 is a RAM, a ROM, or the like, for example, and stores various pieces of information and a program (a processing program or the like) executed by the CPU 101. The auxiliary storage device 106 is a non-transitory storage device (a nonvolatile storage device) such as, for example, an HDD (Hard Disk Drive) or an SSD (Solid State Drive) and stores various pieces of information and a program executed by the CPU 101. In the computer apparatus 100 that forms the learning apparatus 10, the main memory 102 stores the learning data 16 and the setting value information 17, for example. In the computer apparatus 100 that forms the inference apparatus 20, the main memory 102 stores the target data 26 and the setting value information 27, for example. In the computer apparatus 100 that forms the client apparatus 30, the main memory 102 stores the target data 34 and the inference result 35, for example.

The GPU 103 is a processor suitable for execution of a specific process such as an image process, for example, and is appropriate for execution of processes performed in parallel, for example. In the present embodiment, the GPU 103 executes a predetermined process according to an instruction of the CPU 101. In the computer apparatus 100 that forms the learning apparatus 10, the GPU 103 forms the convolution processing unit 13-1 and the like, for example. Moreover, in the computer apparatus 100 that forms the inference apparatus 20, the GPU 103 forms the convolution processing unit 23-1 and the like, for example.

The reader/writer 104 can attach and detach a recording medium 111 thereto and therefrom and performs reading of data from the recording medium 111 and writing of data in the recording medium 111. Examples of the recording medium 111 include a non-transitory recording medium (a nonvolatile recording medium) such as an SD memory card, an FD (floppy (registered trademark) disk), CD, DVD, BD (registered trademark), and a flash memory. In the present embodiment, a processing program may be stored in the recording medium 111 and be read by the reader/writer 104 so that the processing program can be used. Moreover, in the computer apparatus 100 that forms the learning apparatus 10, learning data may be stored in the recording medium 111 and be read by the reader/writer 104 so that the learning data can be used. Furthermore, in the computer apparatus 100 that forms the client apparatus 30, processing target data may be stored in the recording medium 111 and be read by the reader/writer 104 and stored in the storage unit 33.

The communication I/F 105 is coupled to the networks 40 and 50 and transmits and receives data to and from other apparatuses coupled to the networks 40 and 50. The learning apparatus 10 transmits setting value information to the inference apparatus 20 coupled to the network 40 via the communication I/F 105, for example. The setting value notification unit 18 of the learning apparatus 10, the receiving unit 28 and the inference result transmitting unit 29 of the inference apparatus 20, and the transmitting unit 32 and the receiving unit 36 of the client apparatus 30 are formed by the communication I/F 105 and the CPU 101 of the computer apparatus 100 that forms each of the apparatuses.

The input/output I/F 107 is coupled to the input device 109 such as a mouse and a keyboard, for example. In the computer apparatus 100 that forms the learning apparatus 10, the input/output I/F 107 receives operations input by an administrator of the learning apparatus 10 using the input device 109. In the computer apparatus 100 that forms the inference apparatus 20, the input/output I/F 107 receives operations input by an administrator of the inference apparatus 20 using the input device 109. In the computer apparatus 100 that forms the client apparatus 30, the input/output I/F 107 receives operations input by a user of the client apparatus 30 using the input device 109.

A display device 108 is a display apparatus such as a liquid crystal display, for example, and displays and outputs various pieces of information.

Next, an inference result (that is, a recognition result of image recognition) of an inference process on image data performed by the processing system 1 according to the present embodiment will be described.

FIG. 8 is a diagram for describing a recognition result of image recognition in the processing system according to the first embodiment. FIG. 8 illustrates results of image recognition in an example (Examples 1 and 2) in which a modulo operation function and an approximate function according to the present embodiment are used as an activation function used in each activation function processing unit of the neural network model, an example (Reference 1) in which a function which represents an existing activation function in an approximate polynomial is used, and an example (Reference 2) in which a ReLU function is used.

In Example 1, a neural network model including a convolution processing unit, an activation function processing unit, a pooling processing unit, a convolution processing unit, an activation function processing unit, a pooling processing unit, a convolution processing unit, an actual frequency characteristics calculation unit, an affine processing unit, an activation function processing unit, an affine processing unit, and a SoftMax processing unit in that order from the starting layer is used as the neural network models 12 and 22 to be used during learning and inference. Such a modulo operation function as illustrated in FIG. 3 is used during inference and forward propagation of learning as an activation function of each activation function processing unit. A hyperbolic function that approximates to the waveform of the modulo operation function is used as an approximate function during backward propagation of learning.

A learning process of the neural network model 12 was performed using learning data in an MNIST data set, image recognition was performed by inputting test data of the MNIST data set to the neural network model 22 in which the setting values obtained by the learning process were set, and correct answer rates of the recognition result obtained through the image recognition were measured. In Example 1, the minimum of the correct answer rate was 90.0%, the maximum of the correct answer rate was 98.0%, and the average of the correct answer rate was 94.5%.

In Example 2, such a modulo operation function as illustrated in FIG. 3 is used during inference and forward propagation of learning as the activation function of each activation function processing unit, and a high-order trigonometric function that approximates to the waveform of the modulo operation function is used as an approximate function during backward propagation of learning.

A learning process of the neural network model 12 was performed using learning data in an MNIST data set, image recognition was performed by inputting test data of the MNIST data set to the neural network model 22 in which the setting values obtained by the learning process were set, and correct answer rates of the recognition result obtained through the image recognition were measured. In Example 2, the minimum of the correct answer rate was 89.5%, the maximum of the correct answer rate was 98.0%, and the average of the correct answer rate was 94.4%.

In Reference 1, a function which represents an existing activation function (a ReLU function or the like) in an approximate polynomial was used as the activation function of each activation function processing unit of the neural network models 12 and 22, a learning process and the inference process were performed in a manner similar to Examples, and correct answer rates of the recognition result obtained through the image recognition were measured. In Reference 1, the minimum of the correct answer rate was 84.5%, the maximum of the correct answer rate was 94.0%, and the average of the correct answer rate was 90.3%.

In Reference 2, a ReLU function was used as an activation function of each activation function processing unit of the neural network models 12 and 22, a learning process and an inference process were performed in a manner similar to Examples, and correct answer rates of the recognition result obtained through the image recognition were measured. In Reference 2, the minimum of the correct answer rate was 92.0%, the maximum of the correct answer rate was 98.5%, and the average of the correct answer rate was 95.5%.

Referring to the correct answer rates in Examples 1 and 2 and References 1 and 2, it can be understood that a relatively high correct answer rate can be realized similarly to the case of using the ReLU function and the approximate polynomial function in Examples 1 and 2. Therefore, it is understood that the modulo operation function and the approximate function having the waveform of the modulo operation function can be used as the activation function of the neural network, that is, such a function is sufficiently worth using.

Next, a processing system according to a second embodiment will be described. In the following description, a difference from the processing system of the first embodiment will be mainly described.

First, an overview of a processing system according to the second embodiment will be described.

The processing system according to the second embodiment is made in view of a set of layers including a certain processing layer (a pre-processing layer) of a neural network model in the inference apparatus of the processing system according to the first embodiment and a processing layer (an activation function layer) after the processing layer that performs an activation function process.

For example, executing the activation function process of using the modulo operation function as the activation function of the activation function layer after performing the process of the pre-processing layer is the same as executing an addition/subtraction process with modulo operation in the pre-processing layer, for example. From this, it can be understood that, when an addition/subtraction process with modulo operation is performed in the pre-processing layer, even if a process in the activation function layer is eliminated, the same result can be obtained.

Here, a case in which data (encryption data) encrypted by homomorphic encryption having homomorphic properties with respect to operations on a finite cyclic group is used as input data of the pre-processing layer will be discussed. The homomorphic encryption having homomorphic properties with respect to operations on a finite cyclic group is an encryption scheme having such properties that encryption data is data on a finite cyclic group. In additive homomorphic encryption, Paillier encryption and lifted-ElGamal encryption are examples of such an encryption scheme.

Here, the additive homomorphic encryption is a technique in which a result obtained by performing additive operation on a plain text data space with respect to non-encrypted data (plain text data) is obtained by decrypting a result obtained by performing operation (corresponding operation) on an encryption data space corresponding to the additive operation with respect to encryption data. That is, the additive homomorphic encryption is a technique of obtaining a result obtained by performing additive operation with respect to plain text data by performing corresponding operation with respect to corresponding encryption data and decrypting the operation result. For example, in Paillier encryption, an addition/subtraction operation with modulo operation on a plain text data space is a multiplication operation with modulo operation on an encryption data space. Here, an operation with modulo operation means an operation involving modulo operation with respect to an entire operation result.

Encryption data encrypted by the homomorphic encryption (for example, Paillier encryption or lifted-ElGamal encryption) having homomorphic properties with respect to operation on a finite cyclic group is input data of the pre-processing layer. In the pre-processing layer, a result of multiplication with modulo operation with respect to encryption data has the same properties as the result of addition/subtraction with modulo operation with respect to plain text data. Multiplication with modulo operation is operation (corresponding operation) on an encryption data space corresponding to the addition/subtraction with modulo operation with respect to plain text data.

Therefore, it can be understood that, in the pre-processing layer, by performing operation on the encryption data space corresponding to operation with modulo operation of plain text data with respect to encryption data encrypted by homomorphic encryption having homomorphic properties with respect to operation on a finite cyclic group, it is possible to eliminate a processing layer (an activation function corresponding layer) corresponding to a subsequent processing layer (that is, an activation function layer that executes activation function with respect to plain text data) that performs an activation function process subsequently (immediately thereafter or between the pre-processing layer and a subsequent processing layer which need to be separated nonlinearly before processing).

Therefore, an inference apparatus 20A of the present embodiment performs processes using a neural network model 22A obtained by eliminating at least one of subsequent activation function corresponding layers of a processing layer that performs operation on an encryption data space corresponding to a summing operation of plain text data with respect to encryption data encrypted by homomorphic encryption having homomorphic properties with respect to operation on a finite cyclic group from a neural network model having processing layers for encryption data corresponding to the processing layers of the neural network model 22 of the inference apparatus 20 of the first embodiment illustrated in FIG. 4. An activation function used in an activation function layer corresponding to an eliminated activation function corresponding layer in the neural network model 12 of the learning apparatus 10 needs to be set as an activation function illustrated in the first embodiment such that the same processing result is obtained when the activation function corresponding layer is eliminated according to a configuration of the neural network model 22A, a configuration of encryption data used, and the like.

Next, the processing system according to the second embodiment will be described in detail.

The processing system according to the second embodiment includes an inference apparatus 20A (see FIG. 9) instead of the inference apparatus 20 and includes a client apparatus 30A (see FIG. 10) instead of the client apparatus 30.

Figure 9:
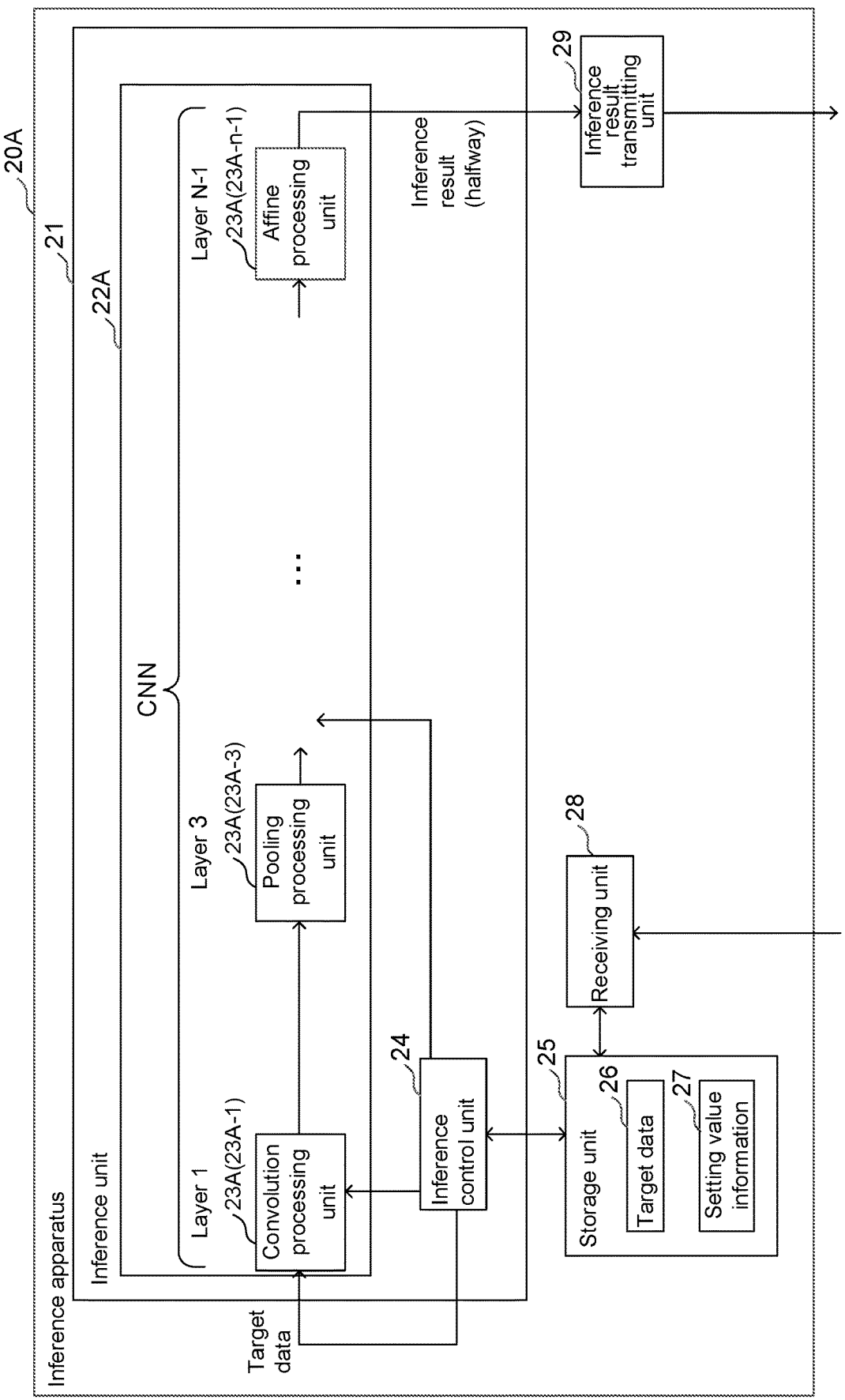
FIG. 9 is a diagram illustrating a functional configuration of an inference apparatus according to a second embodiment.

FIG. 9 is a diagram illustrating a functional configuration of an inference apparatus according to the second embodiment. A hardware configuration of the inference apparatus 20A is similar to that of the inference apparatus 20.

The inference apparatus 20A includes a neural network model 22A. The neural network model 22A includes processing layers (corresponding main processing layers) corresponding to processing layers (main processing layers) other than the activation function layer of the neural network model 22 according to the first embodiment. For example, the neural network model 22A includes a convolution processing unit 23A-1, a pooling processing unit 23A-3, an affine processing unit 23A-n-1, and the like which are corresponding main processing layers that execute an operation process on an encryption data space corresponding to the convolution processing unit 23-1 of layer 1, the pooling processing unit 23-3 of layer 3, the affine processing unit 23-n-1 of layer N-1, and the like, which are main processing layers of the neural network model 22. In this present embodiment, since a process in a partial layer (in this example, the SoftMax processing unit 23-n of layer N) at the rearmost side of the neural network model 22 cannot be executed as an operation process on an encryption data space, the neural network model 22A does not include a processing layer corresponding to the SoftMax processing unit 23-n of layer N, and the process of layer N is executed by the client apparatus 30A as will be described later.

In the neural network model 22A, at least one of processing layers (activation function corresponding layers) corresponding to activation function layers in which a previous processing layer (in the present embodiment, for example, layer 1, layer 3, layer N-1, or the like) that executes a process of summing plain text data is present in the neural network model 22 according to the first embodiment is eliminated since, as described above, a result similar to that of a process of the set of layers including the activation function layer and the previous processing layer is obtained by the process of the processing layer that performs operation on an encryption data space corresponding to the summing operation with modulo operation with respect to the plain text data. Therefore, the neural network model 22A includes a configuration portion in which main processing layers are coupled directly to one another similarly to the convolution processing unit 23A-1 of layer 1 and the pooling processing unit 23A-3, for example. An activation function used in an activation function layer corresponding to the eliminated activation function corresponding layer in the neural network model 12 of the learning apparatus 10 is set as the activation function illustrated in the first embodiment such that a result the same as or closer to the processing result of the corresponding portion of the neural network model 22A is obtained.

In the inference apparatus 20A according to the present embodiment, the receiving unit 28 as an example of an input unit receives encryption data encrypted by homomorphic encryption having homomorphic properties with respect to operation on a finite cyclic group from the client apparatus 30A as target data and stores the encryption data in the storage unit 25, and the inference control unit 24 acquires the target data from the storage unit 25, inputs the target data to the neural network model 22A, and executes an inference process. An inference result (halfway) of the affine processing unit 23A-n-1 of layer N-1 of the neural network model 22A is output to the inference result transmitting unit 29, and the inference result transmitting unit 29 transmits the inference result (halfway) to the client apparatus 30A.

Next, a specific example of a process in a certain affine processing layer of the neural network model 22A will be described. The affine processing layer is a layer that executes a process of calculating the sum of a plurality of pieces of data input from a previous layer.

Here, it is assumed that a plurality of pieces of encryption data (first encryption data and third encryption data) encrypted by the Paillier encryption are input from a previous layer to the affine processing layer. In this description, although it is assumed that two pieces of encryption data are input in order to facilitate description, a similar process is performed even when three or more pieces of encryption data are input.

Various setting used in processing related to encryption are determined as illustrated below. That is, secure primes p and q to be used for encryption are prepared. The procedures and the precautions in determining primes are the same as those of RSA encryption. Moreover, $N=p \times q$. Furthermore, k is set arbitrarily in the range of $0 \le k \le N-1$. In addition, $g=1+kN$. Here, p and q are secret keys and g and N are public keys and system parameters.

Encryption data $C_1$ and $C_2$ input to an affine processing layer are represented by Expressions (1) and (2) below. The encryption data $C_1$ is encryption data obtained by encrypting plain text data m1 ($0 \le m1 \le N-1$) by the Paillier encryption and the encryption data $C_2$ is encryption data obtained by encrypting plain text data m2 ($0 \le m2 \le N-1$) according to the Paillier encryption.

$$C_1 = g^{m1} \times r_1^N \bmod N^2 \qquad (1)$$

$$C_2 = g^{m2} \times r_2^N \bmod N^2 \qquad (2)$$

Here, r1 ($0 \le r1 \le N-1$) and r2 ($0 \le r2 \le N-1$) are random numbers.

In an affine processing layer, operation illustrated in Expression (3) below and a processing result $C_3$ (second encryption data and fourth encryption data) is calculated.

$$C_3 = C_1 \times C_2 \bmod N^2 \qquad (3)$$

Expression (3) is modified to Expression (4) below.

$$\begin{aligned} C_3 &= C_1 \times C_2 \bmod N^2 \\ &= (g^{m1} \times r1^N) \times (g^{m2} \times r2^N) \bmod N^2 \\ &= g^{m1+m2} \times (r1 \times r2)^N \bmod N^2 \\ &= (g^{m1+m2} \bmod N^2 \times (r1 \times r2)^N \bmod N^2) \bmod N^2 \end{aligned} \qquad (4)$$

Here, when $g^x \bmod N^2$ is expanded according to the binomial theorem, it can be expressed as Expression (5) below.

$$g^x \bmod N^2 = (1+kN)^x \bmod N^2 = 1 + xkN + x(x-1)/2 \times k^2 N^2 + \ldots \bmod N^2 \qquad (5)$$

On the right side of Expression (5), since a coefficient $N^2$ is applied to the third and subsequent terms, 0 is obtained for mod $N^2$. As a result, a relation indicated by Expression (6) below is obtained.

$$g^x \bmod N^2 = 1 + xkN \bmod N^2 \qquad (6)$$

In Expression (6), if x=N, a relation indicated by Expression (7) below is satisfied.

$$g^N \bmod N^2 = 1 + NkN \bmod N^2 = 1 \qquad (7)$$

According to Expression (7), it is understood that Expression (8) below is satisfied.

$$g^{x+yN} \bmod N^2 = g^x \times g^{yN} \bmod N^2 = g^x \times (g^N)^y \\ \bmod N^2 = g^x \times 1^y \bmod N^2 = g^x \bmod N^2 \quad (8)$$

Here, y is an arbitrary integer.

When x=m1+m2 is substituted into Expression (8), Expression (9) below is obtained.

$$g^{m1+m2} \bmod N^2 = g^{m1+m2+yN} \bmod N^2 \quad (9)$$

When Expression (4) is substituted into Expression (9), $C_3$ is expressed as Expression (10) below.

$$C_3 = (g^{m1+m2+yN} \bmod N^2 \times (r1 \times r2)^N \bmod N^2) \bmod N^2 \quad (10)$$

A range of m1+m2 is expressed by Expression (11) below due to the ranges of m1 and m2.

$$0 \le m1+m2 \le 2N-2 \quad (11)$$

Therefore, the range of m1+m2+yN satisfies Expression (12) if y is 0 or −1.

$$0 \le m1+m2+yN \le N-1 \quad (12)$$

With such y, it can be expressed as m1+m2+yN=m1+m2 mod N.

As a result, Expression (10) is expressed as Expression (13).

$$C_3 = (g^{m1+m2 \bmod N} \bmod N^2 \times (r1 \times r2)^N \bmod N^2) \bmod N^2 \quad (13)$$

Next, a case in which the processing result $C_3$ indicated by Expression (13) is decrypted by the affine processing layer will be described.

In order to decrypt $C_3$, decrypting data D' indicated by Expression (14) below is calculated.

$$D' = C_3^{(p-1)(q-1)} \bmod N^2 \quad (14)$$

When Expression (13) is substituted into Expression (14), the decrypting data D' is expressed as Expression (15).

$$D' = g^{m1+m2 \bmod N \times (p-1) \times (q-1)} \bmod N^2 \times \\ (r1 \times r2)^{N \times (p-1) \times (q-1)} \bmod N^2) \bmod N2 \quad (15)$$

According to the Euler's totient function, since $\phi(N^2)=\phi(p^2q^2)=p(p-1)q(q-1)=N(p-1)(q-1)$, Expression (16) is satisfied for an arbitrary a by the Euler's theorem.

$$a^{N \times (p-1) \times (q-1)N1} \bmod N^2 = 1 \quad (16)$$

According to Expression (16), $((r1 \times r2)^{N \times (p-1) \times (q-1)} \bmod N^2)$ mod $N^2$=1.

Therefore, Expression (15) is expressed as Expression (17) below.

$$D' = g^{m1+m2 \bmod N \times (p-1) \times (q-1)} \bmod N^2 \quad (17)$$

Using the relation of Expression (6), Expression (17) can be modified to Expression (18) below.

$$D' = 1 + (m1+m2 \bmod N) \times (p-1) \times (q-1)kN \bmod N^2 \quad (18)$$

Subsequently, decrypting data D is calculated using Expression (19) below.

$$D = (D'-1)/N \times (k \times (p-1) \times (q-1))^1 \bmod N \quad (19)$$

Here, $a^{-1}$ for an arbitrary a indicates an inverse of a mod N (that is, a value that satisfies $a \times a^{-1}$ mod N=1). Since an inverse of mod $N^2$ is not present for N, a simple division expression is obtained.
When D' indicated by Expression (18) is substituted into Expression (19), the decrypting data D is expressed as Expression (20).

$$D = m1 + m2 \bmod N \quad (20)$$

As illustrated in Expression (20), a result of performing a mod N operation with respect to the plain text data m1 and the plain text data m2 is obtained by decrypting the processing result $C_3$ of the affine processing layer.

Therefore, it is possible to obtain a processing result on an encryption data space corresponding to a processing result of execution of a processing layer that performs an addition/subtraction operation on plain text data and an activation function layer that performs a mod operation with executing the process of an affine processing layer on an encryption data space and then without performing a process (a process by a function for realizing nonlinear separation) corresponding to the activation function layer.

In the inference apparatus 20A according to the present embodiment, since at least one activation function corresponding layer is eliminated in the neural network model 22A, it is possible to alleviate a processing load of the processes of the neural network model 22A. Moreover, in the neural network model 22A in which the target data is encryption data, since processes are executed with respect to the encryption data as it is, it is possible to appropriately prevent information from leaking from the inference apparatus 20A.

Next, the client apparatus 30A will be described in detail.

Figure 10:
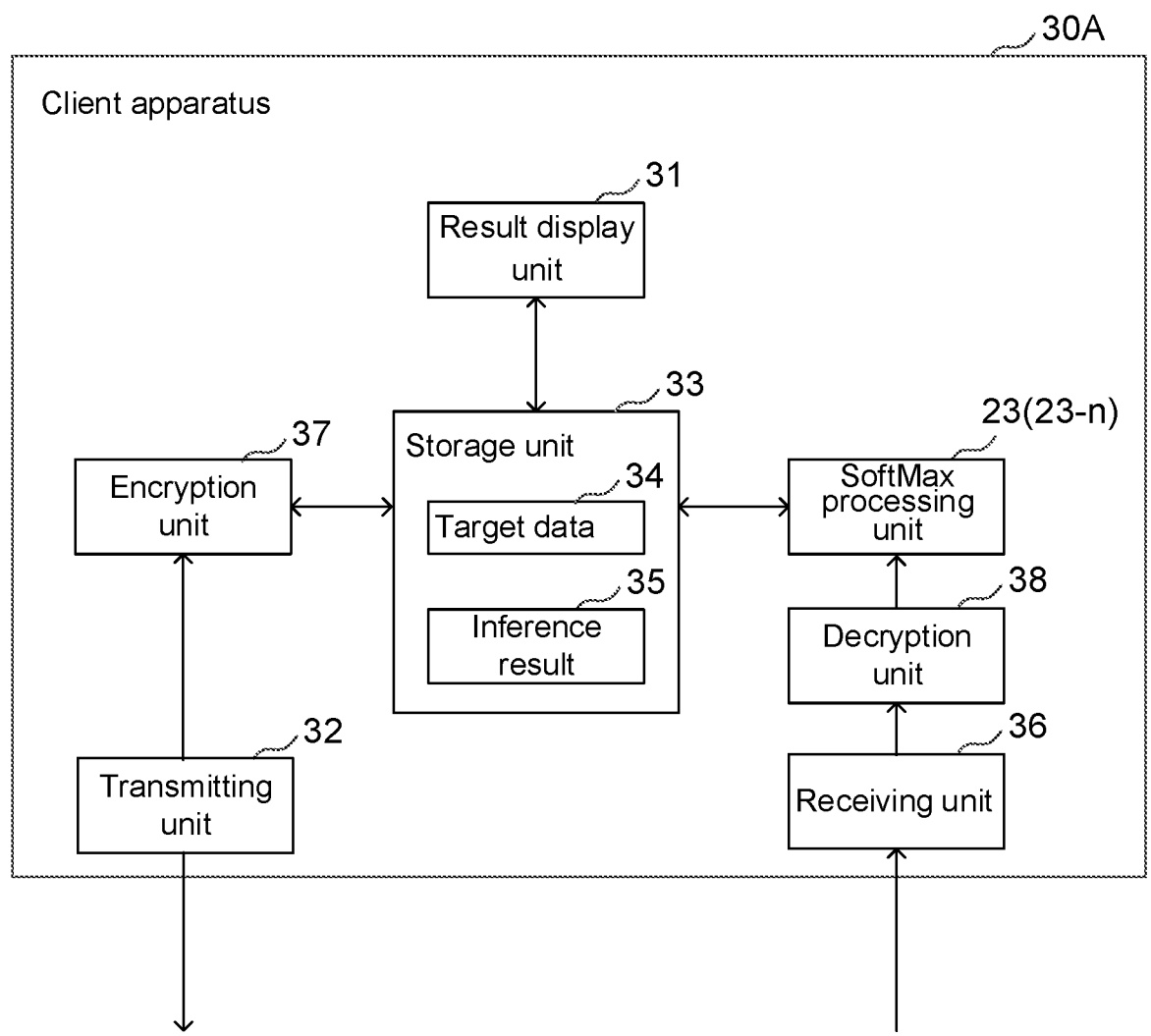
FIG. 10 is a diagram illustrating a functional configuration of a client apparatus according to the second embodiment.

FIG. 10 is a diagram illustrating a functional configuration of a client apparatus according to a second embodiment. A hardware configuration of the client apparatus 30A is similar to that of the client apparatus 30.

The client apparatus 30A further includes an encryption unit 37, a decryption unit 38, and a SoftMax processing unit 23-n in addition to those of the client apparatus 30.

The encryption unit 37 performs encryption by homomorphic encryption (for example, Paillier encryption) having homomorphic properties with respect to operation on a finite cyclic group with respect to the non-encrypted target data 34 stored in the storage unit 33 and delivers the encrypted data to the transmitting unit 32.

The decryption unit 38 receives an inference result (halfway) transmitted from the inference apparatus 20A via the receiving unit 36, performs decryption corresponding to the encryption scheme of the encryption unit 37 with respect to the inference result (halfway), and delivers a decrypted inference result (halfway) to the SoftMax processing unit 23-n.

The SoftMax processing unit 23-n is a processing unit that executes the same process as the SoftMax processing unit 23-n of the neural network model 22 according to the first embodiment, and executes a process based on the SoftMax function with the decrypted inference result (halfway) as input and stores a final inference result (inference result (final)) in the storage unit 33.

Next, a processing operation of the processing system 1 according to the second embodiment will be described.

Figure 11:
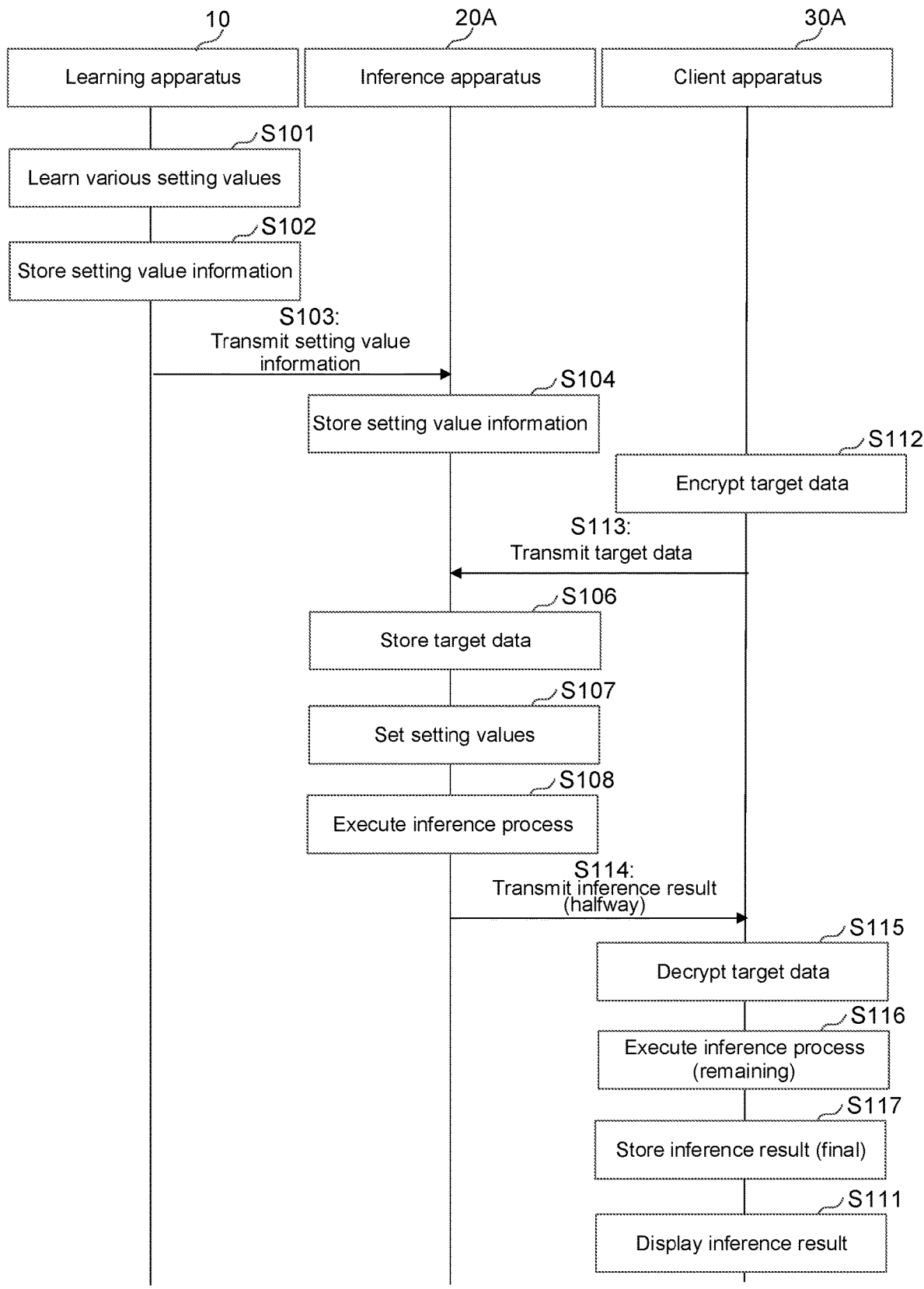
FIG. 11 is a sequence diagram illustrating an operation of a processing system according to the second embodiment.

FIG. 11 is a sequence diagram illustrating an operation of the processing system according to the second embodiment. The same portions as the operations of the processing system according to the first embodiment illustrated in FIG. 6 will be denoted by the same reference numerals and redundant description will be omitted.

The encryption unit 37 of the client apparatus 30A acquires the target data 34 from the storage unit 33 and encrypts the target data 34 according to a predetermined encryption scheme (S112), and the transmitting unit 32 transmits the encrypted target data to the inference apparatus 20A (S113).

The inference control unit 24 of the inference apparatus 20A reads the encrypted target data 26 from the storage unit 25 and inputs the target data 26 to the processing unit 23 of the first processing layer (layer 1) of the neural network model 22A. As a result, in the neural network model 22, an inference process is executed with respect to the target data 26, and an inference result (halfway) is output from the processing unit 23A (the affine processing unit 23A-n-1) of the processing layer (layer N-1) to the inference result transmitting unit 29 (S108).

Subsequently, the inference result transmitting unit 29 of the inference apparatus 20A transmits the inference result (halfway) delivered from the neural network model 22A to the client apparatus 30A that has requested for the inference process of the target data (S114).

The receiving unit 36 of the client apparatus 30A receives the inference result (halfway) from the inference apparatus 20A and delivers the inference result (halfway) to the decryption unit 38, and the decryption unit 38 decrypts the inference result (halfway) (S115) and delivers the decrypted inference result (halfway) to the SoftMax processing unit 23-n. The SoftMax processing unit 23-n executes a remaining process of the inference process with respect to the inference result (halfway) to obtain an inference result (final) (S116) and stores the inference result (final) in the storage unit 33 (S117).

As described above, according to the processing system according to the second embodiment, in the inference apparatus 20A, since a processing layer corresponding to at least a partial activation function layer is eliminated in the neural network model 22A, it is possible to alleviate a processing load of the process of the neural network model 22A and to shorten a processing time. Moreover, in the inference apparatus 20A, since target data is used as encryption data, it is possible to appropriately prevent information from leaking from the inference apparatus 20A.

Next, a processing system according to a third embodiment will be described. In the following description, a difference from the processing system of the first and second embodiments will be mainly described.

The processing system according to the third embodiment includes the learning apparatus 10A instead of the learning apparatus 10 of the processing system according to the second embodiment and the learning apparatus 10A performs learning using encrypted learning data.

Figure 12:
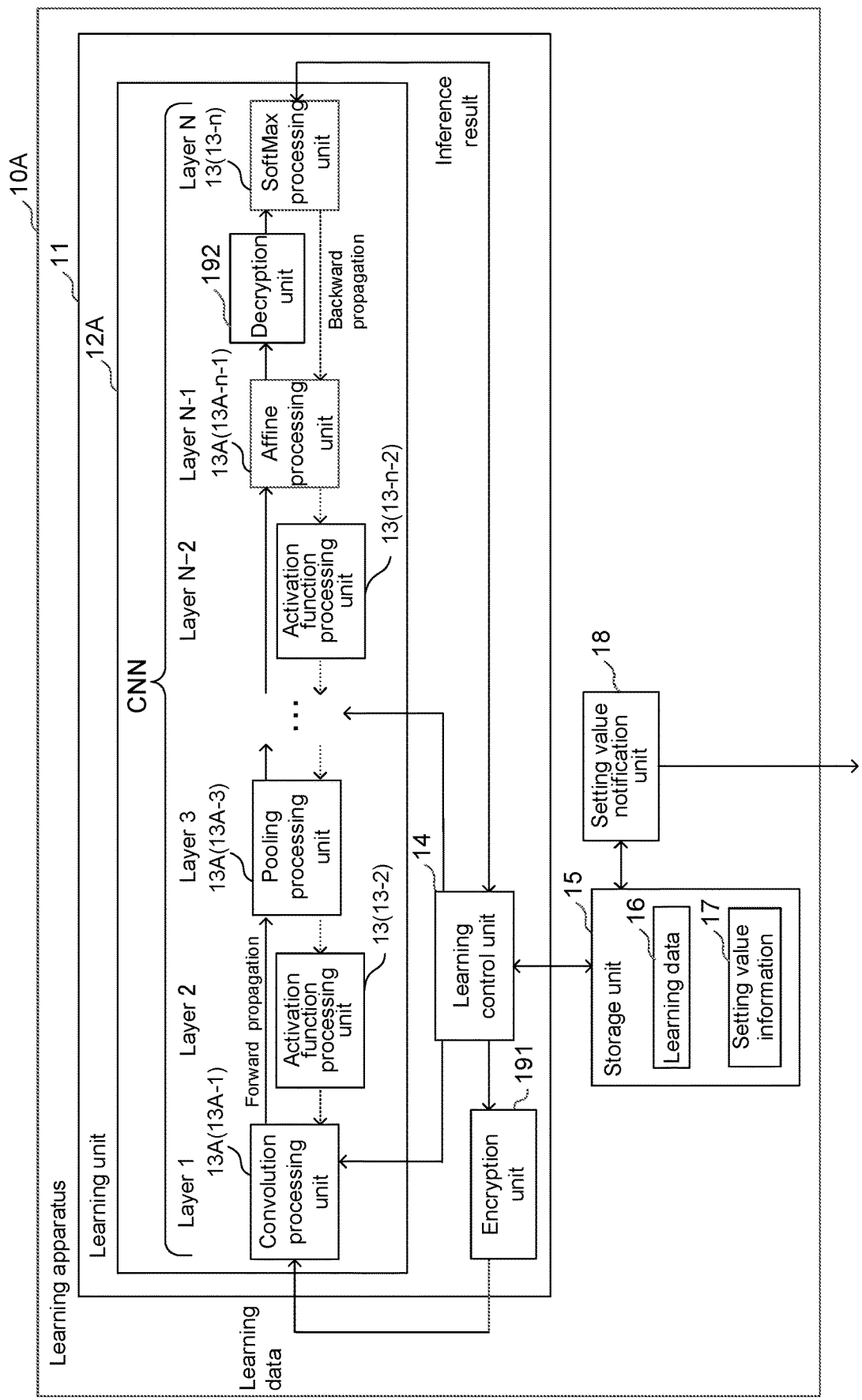
FIG. 12 is a diagram illustrating a functional configuration of a learning apparatus according to a third embodiment.

FIG. 12 is a diagram illustrating a functional configuration of a learning apparatus according to the third embodiment. The same constituent elements as those of the learning apparatus according to the first embodiment will be denoted by the same reference numerals. Moreover, the hardware configuration of the learning apparatus 10A is similar to that of the learning apparatus 10.

The learning apparatus 10A includes a neural network model 12A instead of the neural network model 12 and further includes an encryption unit 191 and a decryption unit 192.

The encryption unit 191 encrypts the learning data according to the same encryption scheme as the encryption scheme applied to the target data in the client apparatus 30A and inputs encrypted learning data to the neural network model 12A.

In the neural network model 12A, a configuration when forward propagation is executed is different from a configuration when backward propagation is executed.

When forward propagation is executed, the neural network model 12A is used as a model including processing units (the convolution processing unit 13A-1 of layer 1, the pooling processing unit 13A-3 of layer 3, the affine processing unit 13A-n-1 of layer N-1, and the like) that form processing layers similar to those of the neural network model 22A of the inference apparatus 20A, the decryption unit 192, and the SoftMax processing unit 13-n of layer N. The convolution processing unit 13A-1, the pooling processing unit 13A-3, the affine processing unit 13A-n-1 and the like during forward propagation execute processes similar to those of the convolution processing unit 23A-1, the pooling processing unit 23A-3, the affine processing unit 23A-n-1, and the like of the neural network model 22A of the inference apparatus 20A. The decryption unit 192 receives the inference result (halfway) output from layer N, performs decryption corresponding to the encryption scheme of the encryption unit 191 with respect to the inference result (halfway), and delivers the decrypted inference result (halfway) to the SoftMax processing unit 13-n.

On the other hand, when backward propagation is executed, the neural network model 12A is used as a model similar to the configuration of a case in which the neural network model 12 of the learning apparatus 10 executes backward propagation. That is, the convolution processing unit 13A-1, the pooling processing unit 13A-3, the affine processing unit 13A-n-1, and the like during backward propagation execute processes similar to those of the convolution processing unit 13-1, the pooling processing unit 13-3, and the affine processing unit 13-n-1 of the neural network model 12 of the learning apparatus 10. The activation function in each of the activation function processing units 13 is an activation function similar to the activation function during backward propagation in the first embodiment (that is, an approximate function (for example, a hyperbolic function) approximated to the sawtooth waveform).

According to the learning apparatus 10A, during execution of forward propagation, processes can be performed by the neural network model 12A including the same configuration or the same configuration portion as that of the neural network model 22A of the inference apparatus 20A using the learning data encrypted by the same encryption scheme as the target data used by the inference apparatus 20A. Therefore, it is possible to output a processing result similar to that of the neural network model 22A of the inference apparatus 20A and perform backward propagation on the basis of this output to learn the setting values. In this way, the suitable setting values can be learned by the neural network model 22A used by the inference apparatus 20A. As a result, the accuracy of the inference process using the inference apparatus 20A can be improved.

The present invention is not limited to the above-described embodiments but can be modified appropriately without departing from the scope of the present invention.

For example, the above-described embodiments illustrate an example in which the present invention is applied to a processing system in which CNN that performs image recognition is configured. However, the present invention can be applied to a processing system in which a neural network that executes an inference process other than image recognition is configured.

In the above-described embodiments, an activation function is used as a modulo operation function. However, the present invention is not limited thereto, and a function other than the modulo operation function may be used as long as the function achieves a similar change.

In the above-described embodiments, the activation function may be a function of a waveform of which the output value changes to approach a minimum value as an input value increases in a range (a first range) from a minimum value of the input value to a first value, the output value is a maximum value of the output value when the input value is the first value, and the output value changes away from the maximum value as the input value increases in a range (a second range) from the first value to a maximum value of the input value or may be a function approximated to this waveform. That is, the activation function may be a function of a waveform of which the output value changes to approach one of the maximum value and the minimum value of the output value as the input value increases in the first range from the minimum value of the input value to the first value, the output value changes away from the other of the maximum value and the minimum value of the output value as the input value increases in the second range from the first value to the maximum value of the input value, and the output value in the first range and the output value in the second range do not have the same output value or may be a function approximated to this waveform.

In the above-described embodiments, additive homomorphic encryption has been described as an example of homomorphic encryption having homomorphic properties with respect to operations on a finite cyclic group. However, the present invention is not limited thereto, and fully homomorphic encryption or SomeWhat homomorphic encryption may be used as long as the encryption scheme is homomorphic encryption having homomorphic properties with respect to operations on a finite cyclic group. Any homomorphic encryption can reduce a processing load of the inference process. Moreover, when SomeWhat homomorphic encryption is used, since the number of operations can be reduced by eliminating the activation function corresponding layer, it is possible to execute a larger number of processes within a limitation of the number of operations of the SomeWhat homomorphic encryption.

For example, when the learning apparatus 10 or the inference apparatus 20 performs processes using plain text data, the processing layer performs operations such as addition/subtraction with respect to the plain text data and the subsequent processing layer performs processes using an activation function. However, the present invention is not limited thereto, for example, the processing layer may performs operations with modulo operation with respect to plain text data so that a subsequent processing layer (the next processing layer or a processing layer before a subsequent processing layer that needs to be separated nonlinearly until execution) does not perform processes (processes of a function that performs nonlinear separation) based on an activation function with respect to the operation result of the operations with modulo operation.

In the second embodiment, an activation function layer immediately after the processing layer other than the activation function layer is eliminated. However, the present invention is not limited thereto, and an activation function layer which is disposed posterior to the processing layer other than the activation function layer and is previous to a subsequent processing layer which needs to be nonlinearly separated until execution may be eliminated.

In the above-described embodiments, at least a portion of the functional units formed when the CPU 101 of the learning apparatus 10 (10A), the inference apparatus 20 (20A), or the client apparatus 30 (30A) executes a program may be formed by another processor in each apparatus or a hardware circuit executing a specific process. Moreover, the processing unit 13 (the convolution processing unit 13-1 or the like) formed by the GPU 103 of the learning apparatus 10 (10A) may be formed by the CPU 101 or may be formed by another hardware circuit. Furthermore, the processing unit 23 (the convolution processing unit 23-1 or the like) formed by the GPU 103 of the inference apparatus 20 (20A) may be formed by the CPU 101 or may be formed by another hardware circuit.

In the above-described embodiments, the receiving unit 28 has been described as an example of an input unit that receives target data. However, the present invention is not limited thereto, and the input unit may be a reader/writer that reads target data from a recording medium having the target data stored therein or may be a camera that fetches image data serving as target data.

In the above-described embodiments, the learning apparatus 10 (10A) and the inference apparatus 20 (20A) are configured as separate hardware components. However, the present invention is not limited thereto, and the apparatuses may be configured as the same hardware component.

In the above-described embodiments, the inference apparatus 20 (20A) and the client apparatus 30 (30A) are configured as separate hardware components. However, the present invention is not limited thereto, and the inference apparatus 20 (20A) and the client apparatus 30 (30A) may be configured as the same hardware components as long as the client apparatus 30 has sufficient processing performance.

What is claimed is:

1. A processing apparatus that executes a predetermined process using a neural network model, the processing apparatus comprising:
   a processor programmed to
      receive encryption data, the encryption data having been encrypted by homomorphic encryption having homomorphic properties with respect to operation on a finite cyclic group; and
      execute the predetermined process with respect to the encryption data using the neural network model while the encryption data is still encrypted, wherein
   the neural network model used by the processor has a processing layer that (i) executes a process of generating second encryption data using a plurality of pieces of first encryption data input from a previous stage and (ii) outputs the second encryption data, the second encryption data is decrypted to obtain a processing result by performing an addition/subtraction operation with modulo operation, the addition/subtraction operation with the modulo operation being an operation on the finite cyclic group with respect to a plurality of pieces of plain text data corresponding to the plurality of pieces of first encryption data, and
   the neural network model is configured such that any activation function is not applied to the output second encryption data between the processing layer and a subsequent processing layer which (i) receives the second encryption data which encrypts the processing result and (ii) is separated nonlinearly from the processing layer.

2. The processing apparatus according to claim 1, wherein the predetermined process is a predetermined inference process, and
   pre-learned setting values are set to the neural network model.

3. The processing apparatus according to claim 2, wherein the setting values are values input from a learning apparatus.

4. A learning apparatus that learns setting values of a neural network model on the basis of predetermined learning data, the apparatus comprising:

a processor programmed to learn setting values of a learning target neural network model on the basis of the learning data using the learning target neural network model; and a learning result storage unit configured to store the setting values of the learning target neural network model learned by the processor, wherein the processor is programmed to execute a process including:

when forward propagation is executed, using, as the learning target neural network model, a neural network model which includes a first processing layer that executes an addition/subtraction operation with modulo operation, the addition/subtraction operation with the modulo operation being an operation on a finite cyclic group with respect to plain text data input from a previous stage and which is configured such that any activation function is not applied to an operation result of the first processing layer in a posterior stage of the first processing layer; and when backward propagation is executed to update the setting values of the learning target neural network model, using, as the learning target neural network model, a neural network model including, instead of the first processing layer, a second processing layer that (i) performs operations excluding the modulo operation from the addition/subtraction operation with the modulo operation in the first processing layer and (ii) includes an activation function layer that is disposed at a posterior stage of the second processing layer to perform an activation function, the activation function (i) being based on a differentiable activation function, and (ii) using, as input, output data output when the forward propagation is executed.

5. The learning apparatus according to claim 4, wherein when backward propagation is executed, the processor is programmed to use, as the activation function of the activation function layer, a differentiable approximate function approximated to any one of a waveform which increases continuously and decreases discontinuously at some values only, and a waveform which decreases continuously and increases discontinuously at some values only.

6. The learning apparatus according to claim 5, wherein the approximate function is a hyperbolic function.

7. A processing method executed by a processor to control a processing apparatus, the processing method comprising:
a process executed by the processor, the process including
receiving encryption data encrypted by homomorphic encryption having homomorphic properties with respect to operation on a finite cyclic group; and executing a predetermined process with respect to encryption data using a neural network model while the encryption data is still encrypted, wherein the neural network model used by the processor has a processing layer that (i) executes a process of generating second encryption data using a plurality of pieces of first encryption data input from a previous stage and (ii) outputs the second encryption data, the second encryption data is decrypted to obtain a processing result by performing an addition/subtraction operation with modulo operation, the addition/subtraction operation with the modulo operation being an operation on the finite cyclic group with respect to a plurality of pieces of plain text data corresponding to the plurality of pieces of first encryption data, and the neural network model is configured such that any activation function is not applied to the output second encryption data between the processing layer and a subsequent processing layer which (i) receives the second encryption data which encrypts the processing result and (ii) is separated nonlinearly from the processing layer.

8. A computer-readable nonvolatile recording medium having stored therein a processing program for causing a processor to execute a process, the process including:
receiving, using the processor, encryption data, the encryption data having been encrypted by homomorphic encryption having homomorphic properties with respect to operation on a finite cyclic group; and executing, using the processor, a predetermined process with respect to the encryption data using a neural network model while the encryption data is still encrypted, wherein the neural network model used by the processor has a processing layer that (i) executes a process of generating second encryption data using a plurality of pieces of first encryption data input from a previous stage and (ii) outputs the second encryption data, the second encryption data is decrypted to obtain a processing result by performing an addition/subtraction operation with modulo operation, the addition/subtraction operation with the modulo operation being an operation on the finite cyclic group with respect to a plurality of pieces of plain text data corresponding to the plurality of pieces of first encryption data, and the neural network model is configured such that any activation function is not applied to the output second encryption data between the processing layer and a subsequent processing layer which (i) receives the second encryption data which encrypts the processing result and (ii) is separated nonlinearly from the processing layer.

* * * * *